Jan. 26, 1965 W. D. WHITE ETAL 3,167,709
APPARATUS FOR MEASURING PULSE INTERVAL OF
QUASI-PERIODIC PULSE SIGNALS
Filed March 24, 1960 3 Sheets-Sheet 1
FIG. 1
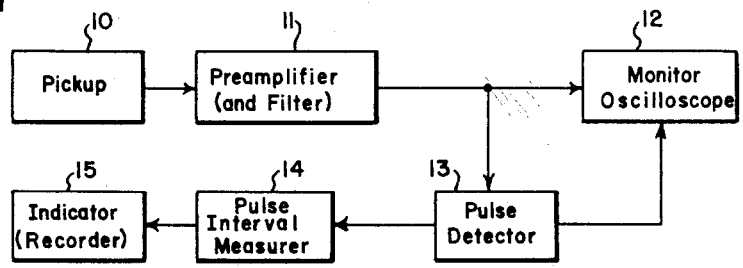
FIG. 2
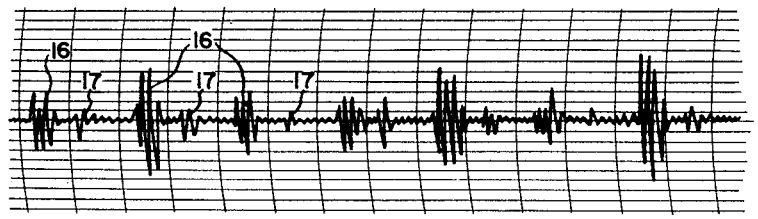
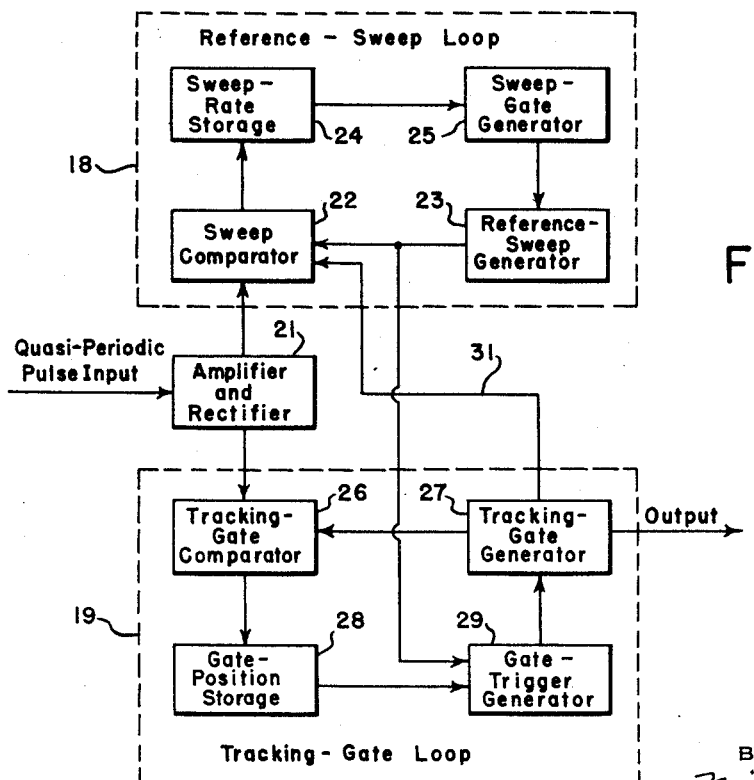
FIG. 3
INVENTORS
WARREN D. WHITE
HERBERT S. SAWYER
BY
ATTORNEYS

INVENTORS
WARREN D. WHITE
HERBERT S. SAWYER
BY
ATTORNEYS

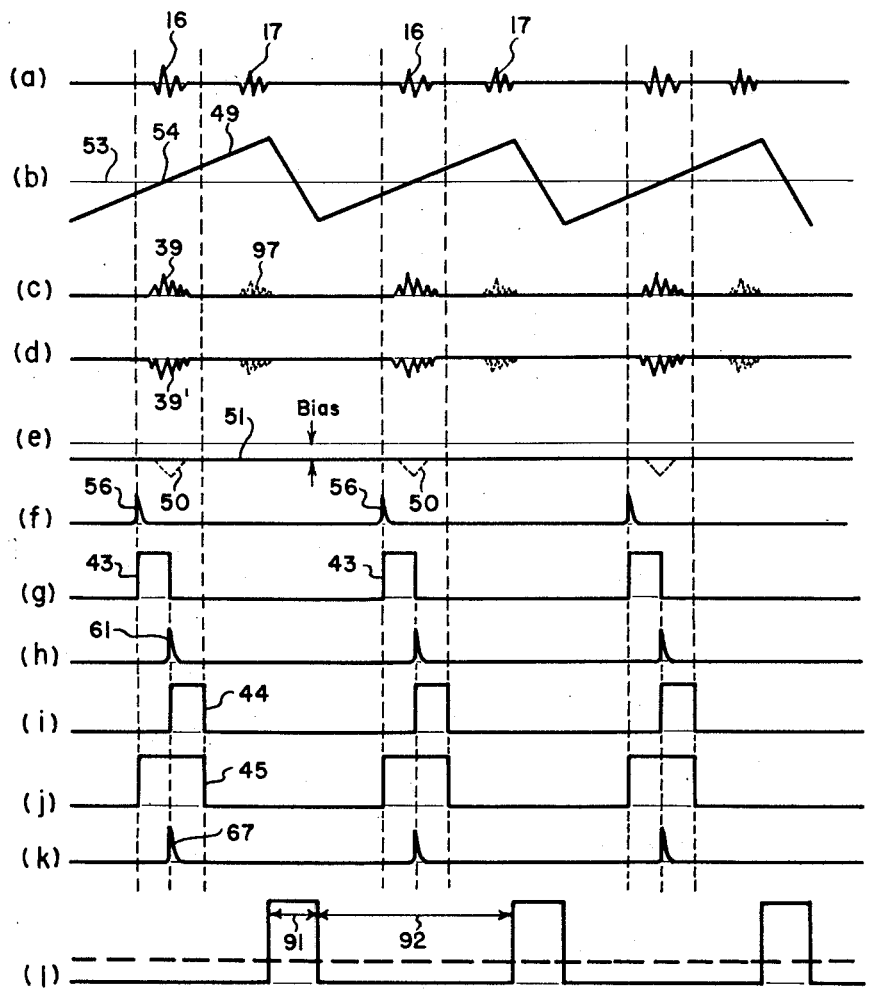

United States Patent Office 3,167,709
Patented Jan. 26, 1965

3,167,709
APPARATUS FOR MEASURING PULSE INTERVAL
OF QUASI-PERIODIC PULSE SIGNALS
Warren D. White, East Norwich, and Herbert S. Sawyer,
Bethpage, N.Y., assignors to Cutler-Hammer, Inc., Milwaukee, Wis., a corporation of Delaware
Filed Mar. 24, 1960, Ser. No. 17,344
8 Claims. (Cl. 324—68)

This invention relates to the measurement of interpulse intervals, particularly interpulse intervals of quasi-periodic pulse signals.

The measurement of intervals between fairly uniformly shaped pulses in a regularly recurring pulse train is known in the art. Also, in so-called "track-while-scan" radar systems it is known to generate a tracking gate coincident with a target echo, and maintain the echo centered in the tracking gate as the target moves. However, the systems used for these purposes have been found unsatisfactory for measuring pulse intervals when the pulse recurrence is irregular, especially when the pulses have complex waveforms and marginal signal-to-noise ratios.

The term "quasi-periodic" pulse signals will be used herein to refer to pulse signals having a certain degree of periodicity in the sense that they are not completely random, but in which the intervals between successive pulses may vary irregularly over a significant range.

One application where the measurement of quasi-periodic pulse signals becomes important is in a fetal heart beat tachometer. Attempts have been made in the past to measure the fetal-heart rate. Electrocardiograph apparatus has been employed for this purpose, and also a phonocardiograph which responds to the sound produced by the fetal heart rather than electric potentials produced thereby. The problem is difficult because the fetal heart beat is masked by the maternal heart beat. The latter, although commonly slower, can give rise to relatively large amplitude signals which make it difficult to determine the fetal heart beat.

By properly positioning a microphone pickup over the abdomen and properly filtering the microphone output, it has been found possible to obtain a useful signal of the fetal heart beat. However, the pulses so obtained are somewhat complex and there are variations in the waveform and amplitude of the pulses, together with considerable noise and interference presumably due to components in the maternal heart beat.

Recordings have been made of the fetal heart beat obtained under these conditions, and it is possible for a person to analyze the recordings to determine the heart beat rate and variations therein. However, such analysis requires considerable skill and is time-consuming. In order to determine the usefulness of fetal heart beat information and its relationship to obstetrical problems, and also to make heart beat information useful in diagnosis, it is important to have an instrument capable of yielding heart rate information reliably and in a readily understandable manner, without requiring excessive time or skill on the part of the operator.

Although the invention will be described in connection with an embodiment particularly suitable for measuring fetal heart beat rates, the invention is generally applicable to the measurement of interpulse intervals of quasi-periodic pulse signals, and hence may find use in widely different fields.

In accordance with the invention, a repetitive reference sweep is generated. The reference sweep is phase-compared with the incoming pulses and the resultant sweep error signal used to control the frequency of the reference sweep. A repetitive tracking gate is also generated and means provided for comparing input pulse signals with the tracking gate to obtain a tracking error signal which varies with changes in phase therebetween. Thus, the tracking error signal represents departures from a given position of an input pulse in the tracking gate, such as departures from a center position therein. This tracking error signal is compared with the reference sweep to obtain a signal which controls the tracking gate generator. Advantageously, the speed of control of the reference-sweep loop is somewhat slow so that the reference-sweep frequency corresponds to the average of the pulse recurrence frequency taken over a number of pulses. However, the tracking-gate loop is advantageously quick-acting so that the position of the tracking gate changes from pulse to pulse in accordance with the varying pulse intervals.

The tracking gate intervals may then be used to measure or otherwise indicate the intervals between successive input pulses. While the intervals may be measured and indicated as such by a suitable meter or recorder, they may also be calibrated in terms of frequency so as to facilitate ready understanding.

The invention will be described in connection with a specific embodiment thereof in which additional features will in part be pointed out and in part be obvious.

In the drawings:

FIG. 1 is a block diagram illustrating a general arrangement of apparatus in which the invention may be used;

FIG. 2 illustrates a fetal heart beat signal;

FIG. 3 is a block diagram showing the general arrangement of the apparatus of the invention;

FIG. 5 shows waveforms explanatory of the apparatus of FIG. 4.

Figure 4:
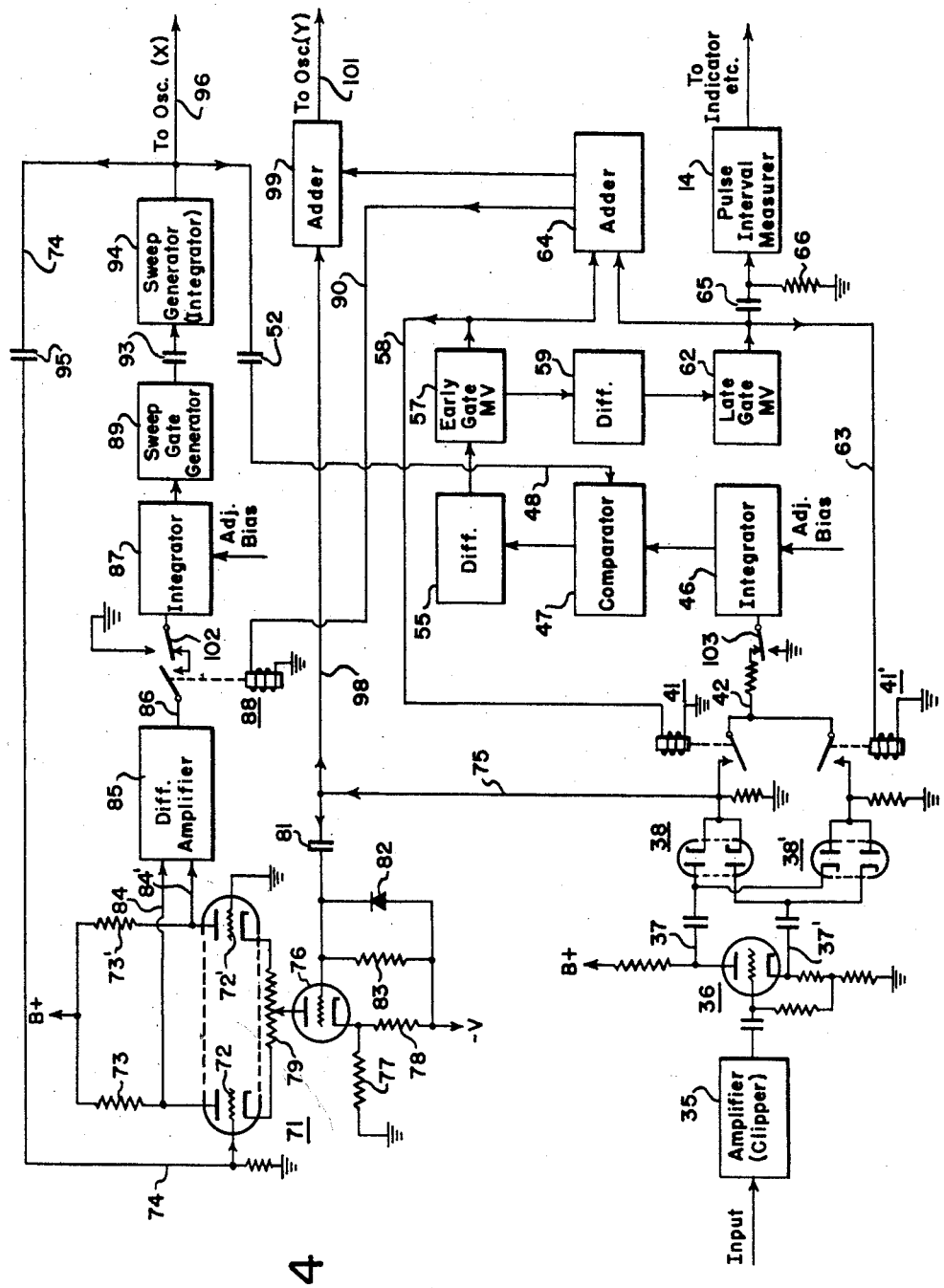
FIG. 4 shows one specific circuit arrangement functioning in accordance with the invention.

Referring to FIG. 1, the pickup 10 is a transducer of a type suitable for the particular application. For sound waves it may be a microphone. The pickup output normally requires amplification and accordingly the pickup is connected to preamplifier 11. Where required, the preamplifier may have a filter of suitable bandwidth incorporated therein. The amplified signal is fed to a monitor oscilloscope 12 for visual observation. It is also supplied to a pulse detector 13 of the invention, which will be described hereinafter. Detector 13 produces output pulses with pulse intervals varying in accordance with the variations in the input pulse intervals. These output pulses are supplied to a pulse interval measurer 14 which produces an output convenient for indication or recording in 15. Any suitable means may be employed for measuring the pulse intervals and suitable instruments are well known. The indicator 15 may be a meter, recorder, etc., as suits the particular application.

In some cases the pulse signals to be measured may already be in the form of an electric signal, and pickup 10 may be omitted. Also preamplifier 11 may be omitted if the signals are already of sufficient amplitude.

In one application in which it was desired to record fetal heartbeats, pickup 10 was a capacity type microphone and preamplifier 11 contained a variable bandpass filter whose lower cutoff frequency could be varied from approximately 2 to 30 or 35 cycles, and the upper cutoff frequency from 65 to 500 cycles.

FIG. 2 illustrates the type of fetal heart beat signal obtained by adjusting the filter bandpass to the optimum bandwidth, in this case 30 to 100 cycles per second. The signals are characterized by relatively stronger first heart sounds 16, each followed by somewhat weaker second heart sounds 17. The actual heart beat frequency depicted is in the range of about 120 to 140 beats per minute. Each individual pulse has several cycles of different amplitude in the range of 30 to 100 cycles per second.

It will be noted that the first sounds vary in amplitude and in waveform, and the intervals therebetween are somewhat irregular. The same is true for the second sounds. In between there are smaller irregularities due to extraneous noises and components of the maternal heart beat. The actual recorded waveform cannot be reproduced exactly by the drafting techniques employed in FIG. 2. However, the figure will suffice to indicate the difficulty in determining the pulse intervals.

FIG. 3 shows a block diagram of a detector which has been found quite satisfactory in determining the interpulse intervals of quasi-periodic pulse signals such as that shown in FIG. 2. After passing through the preamplifier and filter 11 of FIG. 1, the pulse signal is applied to an amplifier and rectifier indicated at 21. The rectified signal is then applied to two loops 18 and 19, designated for convenience as the reference-sweep loop and the tracking gate loop.

In the reference-sweep loop, the rectified pulses from 21 are compared in sweep comparator 22 with a local sweep generated in reference-sweep generator 23. The output from comparator 22 varies with changes in phase between incoming pulses and the reference sweep and is supplied to a sweep rate storage circuit 24 which integrates the error signal over a number of pulses or sweep cycles. The output of the storage circuit 24 is used to control the frequency of the sweep generator so that the sweep frequency corresponds to the average repetition frequency of the incoming pulses over a number of cycles.

The specific manner in which the reference-sweep frequency is controlled by the stored error signal will depend upon the circuits employed for generating the sweep frequency. As here shown, the stored error signal controls a sweep-gate generator 25 which in turn controls the reference-sweep generator 23.

In the tracking-gate loop 19 the rectified incoming signal is supplied to a tracking gate comparator 26, and the locally-generated tracking gate is also supplied from tracking gate generator 27.

It is desired to maintain successive incoming pulses centered in the tracking gate. Accordingly, the output of comparator 26 is supplied to gate position storage circuit 28 which develops a signal varying with departures of the pulses from the center of the gate. The output of 28 is utilized in controlling the generation of the tracking gate.

It has been found important, for overall stability, to utilize both the tracking-gate error signal from storage unit 28 and the reference sweep to control the generation of the tracking gate. Accordingly, the tracking error signal from unit 28 and the sweep from generator 23 are supplied to a gate trigger generator 29 which generates a trigger varying in phase with respect to the reference sweep depending on the tracking error signal. The gate trigger from unit 29 is supplied to tracking gate generator 27.

The control of the generation of the tracking gate under the combined action of the tracking-error signal and the reference sweep may be accomplished in different manners, the generation of a trigger for the purpose being found satisfactory in practice. In general, the tracking-error signal is compared with the reference sweep to obtain a tracking gate control signal which is effective at different times during the reference sweep, depending on the error signal.

With the particular signal shown in FIG. 2, variations in the heartbeat intervals could be obtained by determining the intervals between either successive first sounds or successive second sounds. Inasmuch as the first sounds are commonly of larger amplitude, it is preferred to use them for the purpose, and prevent the second sounds from affecting the operation. Accordingly, the output of tracking gate generator 27 is supplied through line 31 to the sweep comparator to gate off the output of the comparator except during the tracking gate intervals. During initial setup, the two loops 22, 23 are adjusted with the aid of a monitor oscilloscope (see 12 in FIG. 1) so that the first pulses are selected for tracking.

The output of the tracking gate generator 27 is supplied to suitable means for measuring the intervals therebetween and indicating the measurement as described in connection with FIG. 1. If desired, the output could be used for control purposes, depending on the particular application.

Referring to FIG. 4, a more detailed showing of the arrangement of FIG. 3 is given. FIG. 5 shows applicable waveforms and will be referred to during the description of FIG. 4.

The pulse signal input is supplied to amplifier 35. If the signal is subject to large amplitude variations, advantageously amplifier 35 may be provided with suitable clipping circuits to limit the amplitude of the signal fed to subsequent stages. The output of amplifier 35 is supplied to a phase-inverter stage 36 of known type. The input to the phase-inverter stage is shown in FIG. 5(a) as comprising first sound pulses 16 with intervening second sound pulses 17.

The phase inverter outputs in lines 37, 37′ are fed to double diodes 38, 38′ which provide full-wave rectified signals of both positive and negative polarity, as indicated at 39, 39′ in FIGS. 5(c) and 5(d), respectively.

Portions of the two rectified signals are supplied to a common output circuit by switching circuits controlled by early and late gates 43, 44 which together form the tracking gate 45 (FIGS. 5(g), (i), (j)). Since relatively low frequencies are involved in the application to heart beat detection, mechanical relays are sufficiently fast-acting, and accordingly relays 41, 41′ are arranged to switch the detected signals alternately to the common output line 42 under the control of the early and late gates. In applications involving higher frequencies, electronic switching circuits may be employed.

The early and late gates 43, 44 are shown as of equal duration, so that the transition therebetween corresponds to the center of the tracking gate 45. If, as illustrated in FIG. 5, the input pulse 16 is centered in the tracking gate 45, relay 41 will close its contacts during the first half of the positive rectified signal 39 and deliver it to output line 42. Then relay 41 will open and relay 41′ close to deliver the second half of the negative rectified signal 39′ to the output line.

The resulting composite signal in line 42 is supplied to an integrator 46. With proper centering of pulse 16 in tracking gate 45, the integrated signal will be substantially zero. However, if pulse 16 is not centered in the tracking gate 45, more of the positive rectified signal 39 will be supplied to output line 42 than the negative signal 39′, or vice versa, depending upon the direction of displacement of the pulse in the gate. The output of the integrator will accordingly vary in positive or negative directions in accordance with the direction of deviation, with a magnitude proportional to the amount of deviation.

If each pulse 16 were symmetrical with respect to the mid-point thereof, rectified pulses 39, 39′ would also be symmetrical and a zero integrated signal would be obtained when the center of the pulse 16 was in the center of tracking gate 45. As here shown, pulse 16 is not symmetrical and a zero integrated signal will be obtained when the area of the rectified pulse in the early gate 43 is equal to the area of the negative portion of the pulse in the late gate 44. If successive pulses 16 vary in waveform, tracking will correspond to a line through the pulse which divides it into substantially equal effective areas.

The output of integrator 46 is supplied to a comparator 47 which is also supplied with the reference sweep through line 48. The reference sweep is shown at 49 in FIG. 5(b) and the output of integrator 46 by line 51 in FIG. 5(e). During the occurrence of each pulse there will be a deviation from line 51 due to the integration process, as illustrated at 50. It will be understood that line 51 will vary if the pulses depart from the center positions shown. Comparator 47 may be a known type of voltage comparator which yields a distinctive output when the two inputs thereto are equal, or differ by a predetermined amount.

In the present embodiment it is desired to start the tracking gate 45 somewhat before the occurrence of the corresponding signal pulse 16. Accordingly, comparator 47 is arranged to provide a distinctive output in the form of a step signal when the integrated tracking error signal differs from the sweep voltage by a predetermined amount. This may be accomplished by adding (or subtracting) a suitable fixed bias to either the error signal or the sweep signal in comparator 47, and providing sufficient gain.

As specifically shown in FIG. 5(e), a negative bias is applied to the error signal. This may be accomplished by applying a bias, preferably adjustable, to integrator 46, denoted "Adj. Bias." The reference sweep is A.-C. coupled to comparator 47, as by capacitor 52. Accordingly, the A.-C. axis will lie along the line 53 in FIG. 5(b). Since the error signal is negatively biased, the step output of comparator 47 will be obtained slightly prior to the center 54 of reference sweep 49. The step output is supplied to a differentiator 55 to produce pulses 56 in FIG. 5(f). These pulses trigger the early gate generator 57, which may be a monostable or "one-shot" multivibrator. The multivibrator accordingly generates the early gates 43 having a duration determined by the circuit time constants.

The output of the early gate multivibrator is supplied through line 58 to relay 41 whose functioning has been previously described. The output is also supplied to a differentiator 59 to produce pulses 61 at the trailing edges of the gates, as shown in FIG. 5(h). These pulses are supplied to a late gate multivibrator 62 to produce late gates 44. The output of the late gate multivibrator is supplied through line 63 to relay 41'.

The outputs of both the early and late gate multivibrators are supplied to an adding circuit 64 which adds the two gates to form the tracking gate 45.

As thus far described, it will be seen that the circuit shown in the lower half of FIG. 4 functions to generate a tracking gate whose time occurrence is corrected by comparison with input pulses so that any lack of centering of one pulse will be corrected upon arrival of the next pulse. It will be understood that for interpulse intervals which vary in an erratic manner, the corrected position of the tracking gate determined by the arrival of one pulse may not be exactly correct for the next pulse. However, it is found that a very satisfactory correlation between the pulse intervals measured by the embodiment described and that obtained by personal analysis of a graphic recording can be obtained.

The intervals between successive tracking gates vary with the intervals between corresponding pulses and may be supplied to suitable apparatus for measuring the intervals, etc. It is possible to use leading or trailing edges of the tracking gate, or of the early and late gates for this purpose. In FIG. 4 the leading edge of the late gate is employed. To this end the pulses 44 from the late gate multivibrator 62 are fed to a differentiating circuit comprising capacitor 65 and resistor 66. This produces pulses 67 shown in FIG. 5(k) which are fed to the pulse interval measurer.

Referring now to the reference-sweep loop, this is shown in the upper portion of FIG. 4. The sweep comparator includes a differential amplifier 71 comprising two amplifier sections, here shown as triode sections 72, 72' with equal plate resistors 73, 73' connected to a suitable power supply denoted B+. The reference sweep is supplied to the grid of tube section 72 through line 74, and the grid of section 72' is grounded.

The positive rectified signal 39 from double diode detector 38 is supplied through line 75 to a vacuum tube 76 connected in the common cathode circuit of tubes 72, 72'. The cathode of tube 76 is maintained at a suitable potential by means of voltage divider resistors 77, 78 connected between ground and a suitable negative power supply denoted −V. The plate of tube 76 is connected to the slider of potentiometer 79 so as to permit balancing the signals through respective tube sections 72, 72'. A D.-C. reinserter comprising capacitor 81, diode 82 and shunting resistor 83 is provided in the grid circuit of tube 76.

The rectified pulse supplied to the cathodes of tube sections 72, 72' by tube 76 will be amplified by different amounts depending upon the instantaneous potentials on the grids of tube sections 72, 72'. The cathode bias for tube 76 is advantageously selected so that the tube is cut off in the absence of an input pulse. When the rectified pulse occurs, current will flow through tube sections 72, 72'. The magnitude of the current through each tube section will depend upon the magnitude of the pulse signal applied to the cathodes thereof. The division of current between sections 72, 72', however, will depend upon the relative phase of the rectified pulse and the reference sweep applied to the grid of tube section 72. That part of the pulse which occurs while the sweep is negative to ground will cause greater conduction in section 72' than in 72. That part of the pulse which occurs while the sweep is positive to ground will cause greater conduction in section 72. If the pulse is centered at the center of the sweep, the total current through section 72 will equal the total current through 72'.

Accordingly, the difference between the outputs in lines 84 and 84' will be zero when the rectified pulse is centered in the sweep and will be of opposite polarity when the pulse is on opposite sides of the center of the sweep. The outputs in lines 84, 84' are supplied to a differential amplifier 85 which subtracts the two signals and yields an output in line 86 representing lack of centering of the pulse with respect to the sweep, in both amplitude and polarity. This output is supplied to an integrator 87 under the control of relay 88. The relay is supplied with the tracking gate 45 from summer 64 through line 90 so that the sweep frequency is controlled only by pulses occurring during the tracking gate. The integrated output is then used to control the frequency of the reference sweep.

During the initial setup it will commonly be desired to adjust the sweep frequency to approximately that of the incoming signal, so that the automatic control will have adequate range. This may be accomplished in various ways, as by adding a bias to the integrated signal from a source denoted "Adj. Bias."

Many ways of generating sweeps are known in the art and may be employed as desired. In the present application, it is preferred to generate the sweep in such a manner that, as the sweep frequency changes, the ratio of sweep to retrace intervals remains unchanged, so that the slope and D.-C. component of the sweep wave (FIG. 5(b)) are substantially unchanged.

Accordingly, in this embodiment a pulse wave such as shown in FIG. 5(l) is generated and then integrated to give the sawtooth wave of FIG. 5(b). The pulse wave generator is selected so that the ratio of the pulse duration 91 to the interval 92 therebetween remains constant as the pulse repetition frequency changes. In one particular embodiment a relaxation oscillator known as a "double cathode-coupled phantastron" has been employed with success. A circuit of such an oscillator is shown in Radiation Laboratory Series, vol. 19, "Waveforms," by Chance et al., McGraw-Hill Book Company, 1949, p. 204.

The integrated output from 87 is supplied to the sweep gate generator 89 such as a phantastron oscillator, to control the pulse repetition frequency thereof. Generator 89 is then A.C.-coupled as by capacitor 93 to a sweep generator 94 which may take the form of an operational integrator to yield the sawtooth sweep of FIG. 5(b). The sweep is fed back through line 74 to the grid of tube section 72 in the sweep comparator. A capacitor 95 may be inserted to provide A.-C. coupling. Thus, the overall operation of the upper portion of FIG. 4 is to generate a sweep whose average frequency is controlled by the incoming pulse signals during intervals selected by the tracking gate 45.

The selection and detailed design of the circuits represented by blocks in FIG. 4 will be understood by those skilled in the art from the above description. Provision may be made for initial adjustment of the various circuits, as well as manual control of the initial frequencies in the reference-sweep and tracking-gate loops as mentioned above.

As before mentioned, it is desirable to arrange the reference-sweep loop to be relatively slow-acting, so that the sweep frequency corresponds to the average input pulse repetition frequency taken over, say, six or more cycles. On the other hand, it is desirable to have the tracking-gate loop fast-acting, so that the tracking-gate position is corrected promptly after he arrival of a pulse. This may be accomplished by designing the integrators in the two loops and selecting the gains so that the control sensitivity (amount of correction effected by a given change of phase) is relatively high for the tracking-gate loop, and relatively low for the reference sweep loop. Thus the tracking error and sweep signals produce relatively fast and relatively slow corrections, respectively. As pulses arrive with different interpulse intervals, the tracking gate 45 will change position with respect to the sweep 49 from cycle to cycle, but the automatic correction of the sweep frequency will insure that the tracking gate positions remain within the sweeps on successive cycles. Although linear sweeps are desirable, some departure from linearity is permissible without seriously affecting operation.

It is advantageous during initial setup to be able to monitor the incoming pulse signal and the tracking gate so as to enable the desired pulses to be picked out and tracked. To facilitate this comparison the monitor oscilloscope 12 (FIG. 1) may be supplied with the reference sweep through line 96 to deflect the electron beam along the horizontal (X) axis. The positive rectified pulses 39, together with any intervening pulses such as those shown at 97 in FIG. 5(c), are supplied through lines 75 and 98 to an adder 99. The tracking gate 45 is supplied from adder 64 to adder 99 so that the two signals are combined and supplied to the oscilloscope through line 101 to deflect the electron beam along the vertical (Y) axis.

When the apparatus is used with a signal such as shown in FIG. 2, it will be desired to select the pulses (say the first sound pulses 16 ) to be tracked. This may be accomplished by opening the two feed-back loops and adjusting the sweep repetition rate and the position of the tracking gate until the desired pulses occur with the gate, and then closing the loops.

In FIG. 4 switches 102 and 103 are provided for manually opening respective loops. With the loops open, the bias of integrator 87 may be adjusted until the desired pulses are stationary or only slowly drifting along the screen of the monitor oscilloscope. The bias of integrator 46 may be adjusted so that the tracking gate occurs in the center of the sweep. When the desired pulses are in the tracking gate, switches 102 and 103 may be closed (the positions shown) to establish automatic tracking.

When switches 102, 103 are opened to break the respective loops, it will usually be necessary to connect the inputs of the integrators to ground as shown, or to some appropriate potential depending on circuit design, so that when the loops are reestablished the adjusted relationships are substantially unchanged until errors occur requiring correction by the sweep and tracking error signals as previously described.

The invention has been described in connection with a specific embodiment thereof. It will be understood that modifications may be made within the spirit and scope of the invention, as meets the requirements of a particular application.

We claim:

1. Apparatus for measuring interpulse intervals of quasi-periodic pulse signals which comprises means for generating a repetitive reference sweep, means for phase-comparing said pulse signals and said reference sweep to produce a control signal, means for utilizing said control signal to control the frequency of said reference sweep, means for generating a repetitive tracking gate, means for comparing the time occurrence of said pulse signals and said tracking gate to produce an error signal varying with changes in phase therebetween, means for comparing said error signal with said reference sweep to produce a tracking gate control signal, means for utilizing said tracking gate control signal to control the generation of said tracking gate, and means for indicating variations in the time occurrences of the tracking gate.

2. Apparatus for measuring interpulse intervals of quasi-periodic pulse signals which comprises means for generating a repetitive reference sweep, means for phase-comparing said pulse signals and said reference sweep to produce a control signal, means for utilizing said control signal to control the frequency of said reference sweep, means for generating a repetitive tracking gate, means for phase-comparing said pulse signals and said tracking gate to produce a tracking error signal, means for comparing said tracking error signal with said reference sweep to produce a tracking gate control signal effective at different times during the reference sweep as the tracking error signal varies, means for utilizing said tracking gate control signal to control the generation of said tracking gate, and means for indicating variations in the time occurrences of the tracking gate.

3. Apparatus for measuring interpulse intervals of quasi-periodic pulse signals which comprises means for generating a repetitive reference sweep, means for phase-comparing said pulse signals and said reference sweep to produce a control signal, means for utilizing said control signal to control the frequency of said reference sweep, a tracking gate generator, means for phase-comparing said pulse signals and said tracking gate to produce a tracking error signal, means for comparing said tracking error signal and said reference sweep to produce tracking gate control pulses varying in phase with respect to the reference sweep as the error signal varies, means for utilizing said control pulses to trigger said tracking gate generator, and means for indicating variations in the time occurrences of the tracking gate.

4. Apparatus for measuring interpulse intervals of quasi-periodic pulse signals which comprises means for generating a repetitive reference sweep, a phase comparator for producing an output varying with changes in phase of said pulse signals with respect to said reference sweep, means for integrating the output of said comparator to produce a sweep frequency control signal, means for utilizing said control signal to control the frequency of said reference sweep, a generator for generating a tracking gate having early and late gate portions, means for obtaining the integrated difference between the portions of each pulse signal occurring during said early and late gate portions respectively to produce a tracking error signal, means for comparing said tracking error signal and said reference sweep to produce tracking gate control pulses varying in phase with respect to the reference sweep as the error signal varies, means utilizing said control pulses to trigger said tracking gate generator, and means for indicating variations in the time occurrences of the tracking gate.

5. Apparatus for measuring interpulse intervals of quasi-periodic pulse signals which comprises means for generating a repetitive reference sweep, a phase comparator for producing an output varying with changes of phase of said pulse signals with respect to said reference sweep, integrating means for integrating the output of said comparator to produce a sweep frequency control signal, means for utilizing said control signal to control the frequency of said reference sweep, a generator for generating a tracking gate having early and late gate portions, switch and integrating means for obtaining the integrated difference between the portions of each pulse signal occurring during said early and late gate portions respectively to produce a tracking error signal, means for comparing said tracking error signal and said reference sweep to produce tracking gate control pulses varying in phase with respect to the reference sweep as the error signal varies, means utilizing said control pulses to trigger said tracking gate generator, the control of said reference sweep frequency being substantially slower acting than the control of said tracking gate generator, and means for indicating variations in the time occurrences of the tracking gate.

6. Apparatus for measuring interpulse intervals of quasi-periodic pulse signals which comprises means for generating a repetitive reference sweep, detector means for receiving said pulse signals and producing detected outputs of opposite polarity therefrom, a phase comparator supplied with said reference sweep and at least one of said detected outputs for producing an output varying with changes of phase therebetween, integrating means for integrating the output of said comparator to produce a sweep frequency control signal, means for utilizing said control signal to control the frequency of said reference sweep, a generator for generating a tracking gate having early and late gate portions, switch means controlled by said early and late gate portions for supplying respective portions of said detected outputs of opposite polarity to a common output circuit, integrating means supplied from said common output circuit for producing a tracking error signal, means for comparing said tracking error signal and said reference sweep to produce tracking gate control pulses when the signal and sweep differ by a predetermined amount during respective cycles, means utilizing said control pulses to trigger said tracking gate generator, and means for indicating variations in the time occurrences of the tracking gate.

7. Apparatus for measuring interpulse intervals of quasi-periodic pulse signals which comprises means for generating a repetitive reference sweep, detector means for receiving said pulse signals and producing detected outputs of opposite polarity therefrom, a phase comparator supplied with said reference sweep and at least one of said detected outputs for producing an output varying with changes of phase therebetween, integrating means for integrating the output of said comparator to produce a sweep frequency control signal, means for utilizing said control signal to control the frequency of said reference sweep, a generator for generating a tracking gate having early and late gate portions, switch means controlled by said early and late gate portions for supplying respective portions of said detected outputs of opposite polarity to a common output circuit, integrating means supplied from said common output circuit for producing a tracking error signal, means for comparing said tracking error signal and said reference sweep to produce tracking gate control pulses when the signal and sweep differ by a predetermined amount during respective cycles, means utilizing said control pulses to trigger said tracking gate generator, the control of said reference sweep frequency being substantially slower acting than the control of said tracking gate generator, and means for indicating variations in the time occurrences of the tracking gate.

8. Apparatus for measuring interpulse intervals of quasi-periodic pulse signals which comprises means for generating a repetitive reference sweep, detector means for receiving said pulse signals and producing detected outputs of opposite polarity therefrom, a phase comparator supplied with said reference sweep and at least one of said detected outputs for producing an output varying with changes of phase therebetween, integrating means for integrating the output of said comparator to produce a sweep frequency control signal, means for utilizing said control signal to control the frequency of said reference sweep, a generator for generating a tracking gate having early and late gate portions, switch means controlled by said early and late gate portions for supplying respective portions of said detected outputs of opposite polarity to a common output circuit, integrating means supplied from said common output circuit for producing a tracking error signal, means for comparing said tracking error signal and said reference sweep to produce tracking gate control pulses when the signal and sweep differ by a predetermined amount during respective cycles, means utilizing said control pulses to trigger said tracking gate generator, the control of said reference sweep frequency being substantially slower acting than the control of said tracking gate generator, means controlled by said tracking gate for supplying an output from said phase comparator to the first-mentioned integrating means substantially only during said tracking gate, and means for indicating variations in the time occurrences of the tracking gate.

References Cited in the file of this patent
UNITED STATES PATENTS 2,928,083   Kernan _____ Mar. 8, 1960

FOREIGN PATENTS 661,954   Great Britain _____ Nov. 28, 1951